Jan. 23, 1962    R. A. KLEIST ET AL    3,018,475
RESPONDER DEVICE
Filed Feb. 15, 1960    2 Sheets-Sheet 1
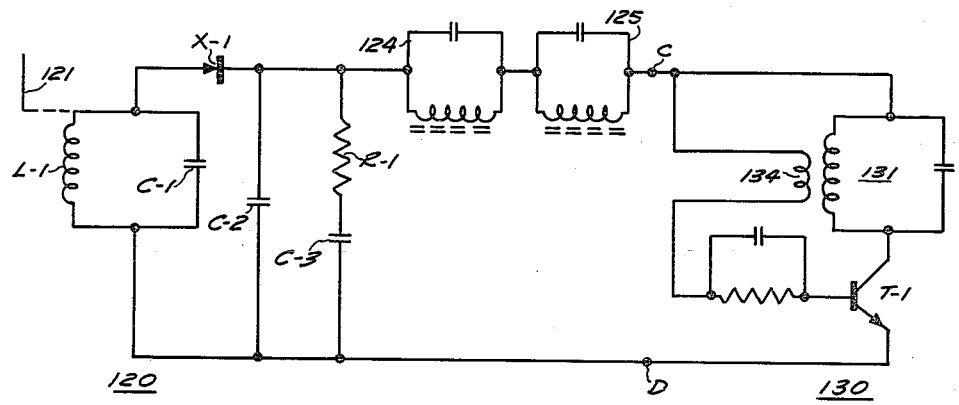
FIG. I
PRIOR ART
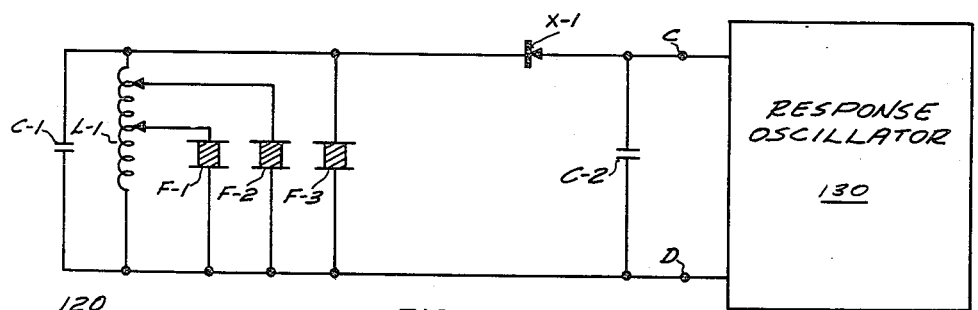
FIG. 2
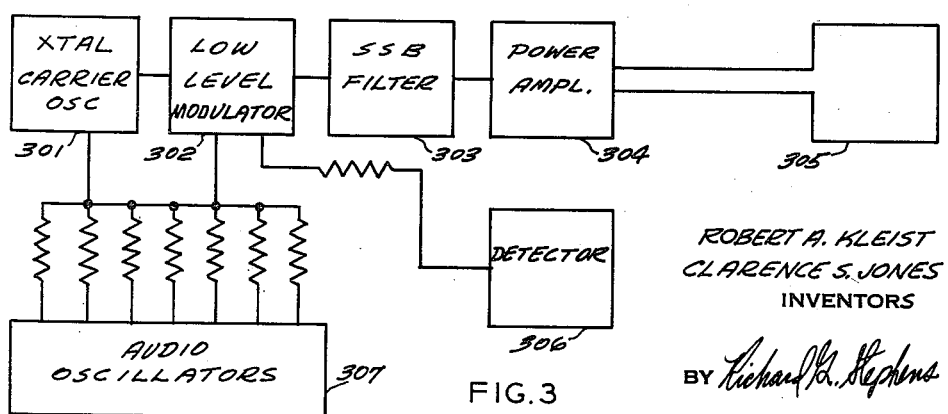
FIG. 3
ROBERT A. KLEIST
CLARENCE S. JONES
INVENTORS
BY Richard R. Stephens
ATTORNEY Jan. 23, 1962 R. A. KLEIST ET AL 3,018,475
RESPONDER DEVICE
Filed Feb. 15, 1960 2 Sheets-Sheet 2
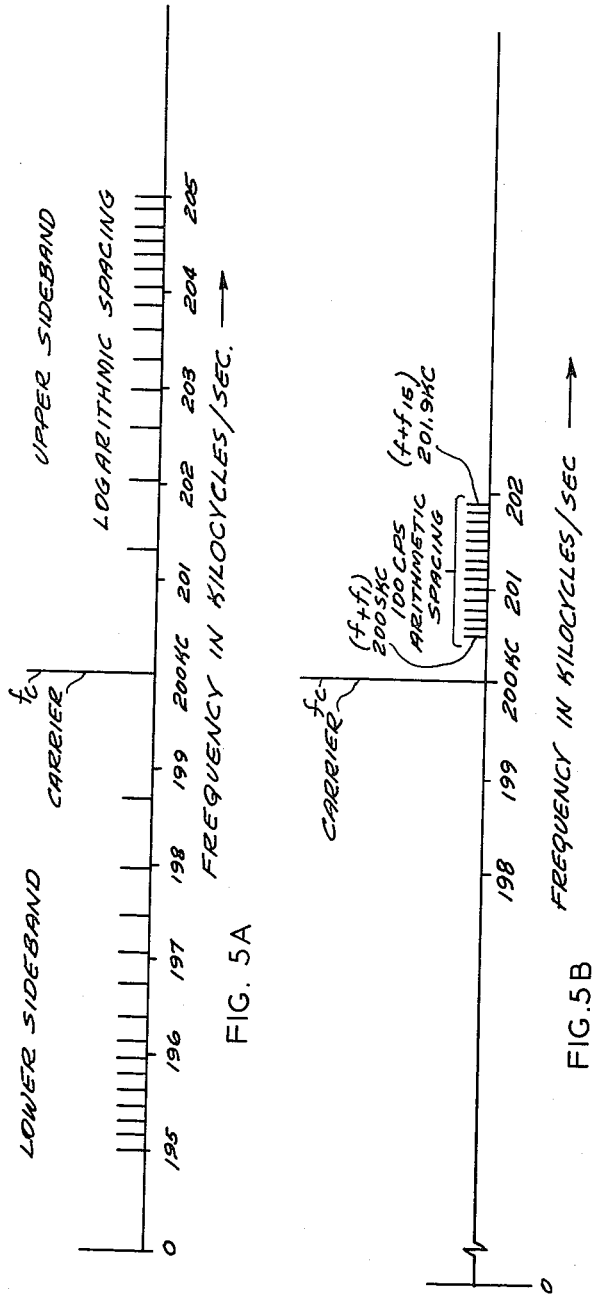
FIG. 5A
FIG. 5B
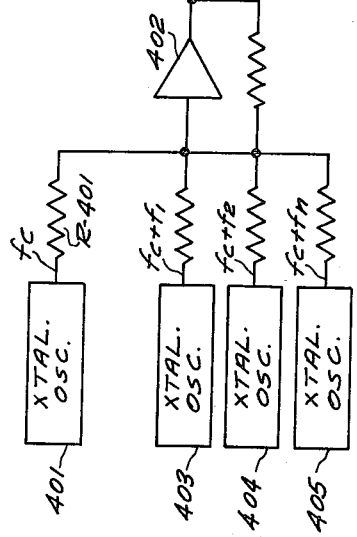
FIG. 4
ROBERT A. KLEIST
CLARENCE S. JONES
INVENTORS
BY *Richard G. Stephens*
ATTORNEY

United States Patent Office 3,018,475
Patented Jan. 23, 1962

3,018,475
RESPONDER DEVICE
Robert A. Kleist, Sunnyvale, and Clarence S. Jones, Los Altos, Calif., assignors to General Precision, Inc., Binghamton, N.Y., a corporation of Delaware
Filed Feb. 15, 1960, Ser. No. 8,723
12 Claims. (Cl. 343—6.8)

This invention relates to interrogator-responder signalling systems, and to an improved responder device. Application Ser. No. 739,909 filed June 4, 1958 by C. S. Jones and assigned to the same assignee as the present invention, discloses an interrogator-responder system capable of electronically transmitting data between an interrogator device and one or more passive responder devices, where the two are capable of relative motion, so that signals may be provided from the responder which uniquely identify the responder and, or instead, indicate one or more conditions associated with the responder. One exemplary disclosed application of the prior invention is the use of passive responder devices on vehicles, such as railroad box cars, for the purpose of identifying each vehicle as it passes along a track adjacent to which an interrogator unit is located. The responder devices may be small and inexpensive, and being passive, no wired power sources or power cells are needed for the responders. Due to a number of reasons, these prior systems are more accurate and reliable and have much more system capacity than other prior art systems. Signalling system apparatus of this general type is marketed under the trademark "Tracer" by the assignee of this application.

In the embodiment of signalling apparatus disclosed in application Ser. No. 739,909, an interrogator unit, essentially a transmitter-modulator unit, supplies to an output coil a signal consisting of a high frequency carrier having a plurality of low frequency subcarriers modulated on it. A responder, when located within the effective field of the interrogator signal, as when a box car carrying a responder nears the interrogator output coil, operates to demodulate the interrogator signal to provide power to operate an oscillator in the responder, thereby to provide a response signal having a different high frequency. When any responder is located away from the interrogator coil more than a certain distance, the signals induced in the responder input circuit are too weak to power the response oscillator to enable it to oscillate. At some closer location oscillation may occur, but response signals may be weak, intermittent or unreliable. At nearer locations ample power may readily be induced in a responder to insure adequately powerful response signals. By means of automatic gain control techniques shown in detail in previous applications response signals are ignored until they exceed a desired threshold strength.

Each responder also operates on the low frequency subcarriers of the received interrogator signal, selectively filtering out or selectively preserving and passing certain of the subcarriers, so as to provide a different and coded group of subcarriers, which are used to modulate the response carrier provided by the response oscillator, thereby providing subcarrier modulation in the response signal from each responder which is unique to the particular responder. By demodulating a given response signal and determining which subcarriers are present or which are absent in the given signal, the identity of and conditions associated with a given responder may be automatically determined.

In apparatus of the character described it is highly desirable to provide responders which are as small and lightweight as possible, and further desirable to provide systems of the type described utilizing minimum bandwidth without sacrifice in the tremendous system capacity. "System capacity" refers to the number of unique and different responders which the system can utilize and distinguish between. It is obvious that system capacity may be increased by the use of additional subcarriers, but any added subcarrier imposes a requirement for additional system bandwidth. While subcarriers may be crowded together and spaced at near frequencies to a certain extent, spacings which are too close may greatly complicate necessary filtering, requiring complex and sizeable filters of considerable weight.

It is thus a primary object of the present invention to provide an improved interrogator-responder signalling system utilizing responders which may be smaller and lighter than those of the prior art.

It is a further object of the invention to provide an improved interrogator-responder signalling system which requires less bandwidth for transmission of a given amount of information.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

FIG. 1 is an electrical schematic diagram illustrating a prior responder unit constructed in accordance with teachings of application Ser. No. 739,909;

FIG. 2 is an electrical schematic diagram illustrating an exemplary embodiment of the present invention.

FIG. 3 is a block diagram of a single sideband interrogator transmitter unit which may be used with the present invention;

FIG. 4 is a block diagram of an improved special single sideband interrogator transmitter unit which may be used with the present invention;

FIG. 5a is a graph illustrating the nature of the interrogator signals utilized by prior apparatus;

FIG. 5b is a graph illustrating the nature of the interrogator signals which may be used in accordance with the present invention.

The prior art responder device of FIG. 1 includes a tuned input circuit shown as comprising parallel tuned circuit 120 having inductor L–1 and capacitance C–1, sometimes with an external inductor 121, depending upon the precise application. Whenever tuned circuit 120 moves sufficiently near the interrogator coil, a voltage will be induced into tuned circuit 120. The voltage appearing across tuned circuit 120 is applied through a conventional demodulator shown as comprising diode rectifier X–1 and capacitor C–2. In prior systems a double sideband amplitude-modulated interrogator signal of the nature shown in FIG. 5a has been used. The signal consists of a 200 kc. carrier $f_c$ and fifteen sideband frequencies logarithmically spaced within a 10 kc. band centered on the carrier. The demodulator has served to demodulate the interrogator signal, thereby providing a first composite signal. The first composite signal has a direct or continuous voltage component and a plurality of low frequency or audio components corresponding in number to the number of pairs of sidebands of the signal shown in FIG. 5a, each sideband of the signal contributing to a low frequency or audio signal differing in frequency from its sideband by the frequency of the interrogator carrier. For convenience of explanation the frequencies of the carrier and side bands may be referred to as "radio frequency" or "RF" and the frequencies of the subcarriers referred to as "audio" although subcarriers used need not necessarily be limited to the audible portion of the spectrum. A series RC circuit shown as comprising resistor R–1 and capacitor C-3 may be used to avoid clipping and cross-modulating of the subcarrier signals, in accordance with a technique explained in copending application Ser. No. 850,828 filed Nov. 4, 1959 by Robert A. Kleist. The first composite voltage is applied through a coding network to eliminate one or more of the audio or subcarrier frequencies, thereby providing a coded composite signal still having a direct voltage component, but having a group of audio or subcarrier components different from the group of the first composite signal. In FIG. 1 the coding network is shown as comprising two parallel-resonant tuned circuits 124, 125 inserted in series with the signal so that they act as rejection filters, attenuating in the second composite signal those two audio or subcarrier components corresponding in frequency to the resonant frequencies of circuits 124 and 125. The second composite voltage may be coded differently in each different responder so as to eliminate different audio components in different responders. For example a different number of filters may be used in another block, or filters tuned to different audio frequencies may be used. As mentioned in application Ser. No. 739,909, a variety of coding arrangements are available, and series tuned circuits may be used as well as parallel tuned circuits.

The coded composite voltage is applied as shown in FIG. 1 to operate a response oscillator 130. The composite voltage will be seen to be applied through the resonant tank circuit 131 of response oscillator 130 and across the collector-emitter circuit of transistor T–1, causing transistor current flow. Inasmuch as the remaining thirteen audio voltages (i.e. those not filtered out by the coding network) are superimposed upon the direct voltage, the output signal from response oscillator 130 automatically will be double sideband amplitude-modulated with the remaining thirteen audio or subcarrier voltages. Tickler coil 134 regeneratively couples a portion of the response oscillator output signal to the transistor base electrode to provide the positive feedback necessary for oscillation. A variety of alternative semi-conductor oscillators are known and may be substituted. To compare the prior system of FIG. 1 properly with the present invention, it is important to note that low frequency or "audio" filters are used for coding, and to recognize that low frequency filters usually are far greater in cost, size and weight than most RF or higher frequency filters.

FIG. 2 illustrates an exemplary embodiment of the improved responder of the present invention. In the improved device no low frequency or audio filters are required for coding. Instead, high frequency sideband frequencies are selectively attenuated by means of crystal filters connected to the responder pickup coil circuit. In FIG. 2 crystal filters F–1, F–2 and F–3 are shown connected in parallel circuit relationship to pickup coil inductance L–1, which is suitably tapped to provide desired impedance match and bandwidth for various ratios of L–1 and capacitance C–1. The crystal filters present very low impedances at their respective series resonant conditions, shunting and effectively shorting out the responder tank circuit at the discrete high frequency series-resonant frequencies to which the crystals are designed. Hence the prior system of Ser. No. 739,090 uses low frequency or audio filters to filter out certain low frequency subcarrier or audio components after demodulation, while the present invention utilizes high frequency RF filters to filter out certain sidebands before demodulation. The savings in weight and space from use of small crystal filters instead of audio filters is very important. The invention is able to use radio frequency elements such as crystal filters for encoding because encoding is actually done at radio frequencies, when data to be encoded exists in the form of high frequency sidebands to the interrogator carrier. By selectively eliminating sidebands prior to demodulation one can accomplish the same thing as audio filtering accomplishes after detection, but with the advantage of being able to use RF filter elements instead of audio filters. Moreover, succeeding circuit non-linearities, such as diode efficiency, do not impair attenuation of the desired subcarriers. Those sidebands not filtered out become low frequency or audio components present between terminals C and D in FIG. 2 and modulate the response oscillator carrier, and a response receiver tuned to pick up the response signal demodulates the response signal to provide low frequency, or audio signals.

In order to remove a given audio frequency from the response signal by high frequency filtering, one must remove all sidebands contributing to the given subcarrier or audio frequency. For example, if sidebands are to be selectively filtered out of an interrogator signal having a carrier frequency $f_c$ so that an audio or subcarrier frequency $f_1$ will not occur upon detection of the response signal, two filters, centered on $(f_c+f_1)$ and $(f_c-f_1)$, respectively, must be used if the signal is a double sideband type. If the signal is single sideband, it will be seen that only one filter is needed to filter out a given subcarrier, and hence single sideband transmission from the interrogator to the responders requires only half as many crystals in the responders and therefore is much to be preferred.

Single sideband transmission also is advantageous from the standpoints of economy, miniaturization and bandwidth. As will be further explained, signals of the type illustrated in FIG. 5b and others generated for use with the invention may be a special type of single sideband signal, since they consist of completely separate and discrete frequency components, while most single sideband systems use continuous bands of spectrum, for voice transmission, for example. The use of the term "single sideband" is not intended to exclude signals where the carrier is spaced in between various of the sidebands. For example, in FIG. 5b, the signal would still be regarded as single sideband if the carrier were transmitted at some frequency between 200.5 kc. and 201.9 kc., so that each sideband still differs from the carrier by a unique amount. The signal would not be regarded as single sideband if all sidebands were symmetrically spaced on opposite sides of the carrier.

A graph of a typical single sideband transmitted interrogator signal which may be used to operate responders of the improved type is shown in FIG. 5b. The signal illustrated in FIG. 5b also contemplates a fifteen digit coding system. The carrier frequency $f_c$ is shown as 200 kilocycles, with an amplitude substantially exceeding any sideband amplitude. Fifteen separate and discrete sidebands of different frequencies and lesser amplitudes are shown. Assume that a signal of the nature shown in FIG. 5b is applied to a responder such as that shown in FIG. 2, but that the crystal filters shown are removed. Assuming further that tuned circuit 120 of FIG. 2 is tuned broadly enough to cover the band extending from 200 kc. to 201.9 kc., it will be seen that a composite voltage containing a carrier component and all fifteen sideband components will be developed across tuned circuit 120. If then demodulated, as by means of diode X–1 and capacitor C–2, which form a detector, the second composite voltage between terminals C and D will comprise a direct component, from rectification of the carrier, plus fifteen low frequency subcarrier or audio frequencies, each of which differs from one of the RF sideband frequencies by the amount of the carrier frequency. For example, if no crystal filter is used to trap out the $(f_c+f_1)$ sideband of 200.5 kc., a 500 c.p.s. component will exist in the second composite voltage, modulating the response carrier, and being reproduced by the response receiver as a 500 c.p.s. voltage.

FIG. 3 illustrates, in block diagram form, a known type of single sideband transmitter which may be used in connection with responder devices of the improved type shown in FIG. 2. The carrier frequency output signal from master oscillator 301 is modulated in modulator 302 by a plurality of audio subcarrier frequencies applied through scaling resistors from a group of audio oscillators represented by block 307. Although fewer scaling resistors are shown, it will be recognized that fifteen audio oscillators would be provided for a fifteen digit system. The output of the low level modulator, which is conventional double sideband amplitude modulation, then is fed through single sideband filter 303, which removes the lower sideband in the example shown. The resulting single sideband signal then is amplified by conventional power amplifier 304 and applied to drive the interrogator output inductor 305. Detector 306 is responsive to the output signal of amplifier 304 and demodulates it to provide a control signal for linearizing the power amplifier and low level modulator.

This method of single sideband transmission is shown herein by way of example, and it per se is not a part of the present invention. In lieu of the transmission system of FIG. 3 a number of other known single sideband transmission schemes may be used. An arrangement of particular merit which may be used in connection with responders of the type shown in FIG. 2 is the improved system shown in FIG. 4. The system of FIG. 4 is described in detail, explained and claimed in Appl. Ser. No. 15,597, filed on even date herewith by Robert A. Kleist for "Signalling System." In FIG. 4 there is provided a fixed frequency crystal-controlled oscillator 401 which provides a carrier frequency signal $f_c$ to a summing circuit via scaling means shown as comprising scaling resistor R-401. Similarly, a plurality of sideband fixed frequency crystal oscillators 403, 404 and 405 independently provide further radio frequency signals to the summing circuit via respective scaling resistors. In the case of a fifteen digit system, fifteen sideband oscillators would be provided. The summing circuit is shown by way of example as comprising a conventional feedback amplifier 402. As indicated in FIG. 4, each sideband oscillator frequency differs from the carrier frequency $f_c$ by the amount of a desired subcarrier or "audio" frequency. The summed signal at the output of the summing circuit is amplified by a power amplifier 407, which should be made reasonably linear so as to preserve relative amplitudes of the various components of the sum signal. The amplified signal from power amplifier 407 is applied to drive the interrogator output inductor or power-inducing coil 408. Analysis of the output signal from the apparatus of FIG. 4 will reveal that it produces the same type of signal as the conventional single sideband transmitter of FIG. 3, but by use of high frequency oscillators in lieu of audio oscillators, and without any modulator being required.

Now that both the prior system and the present invention have been described, the important advantages of the present invention may be considered in more detail. Since encoding is done by filtering at much higher frequencies, by use of RF rather than audio filters in the present invention, the subcarriers may, in effect, be spaced more closely together. For example, the embodiment of appl. Ser. No. 739,909 considered in connection with FIGS. 1 and 5a utilizes fifteen audio frequencies spaced between 500 c.p.s. and 5 kc., and in order to trap out each frequency properly it was necessary to space the fifteen channels logarithmically. Typical logarithmic spacing is shown in FIG. 5a. Logarithmic or near logarithmic spacing is most economical when audio filters must be used, as filters for the high end of the audio band must be spaced farther apart than those for the low end, unless undesirably complex and large filters are used. However, when RF crystal filters are used in accordance with the present invention, one may use arithmetic spacing, since the bandwidths of all of the crystal filters are almost identical, so that subcarriers for a fifteen channel system now may use 500 c.p.s. to 1900 c.p.s. with a 100 c.p.s. regular spacing, or may use 500 c.p.s. to 2180 c.p.s. with a regular 120 c.p.s. spacing. Arithmetic spacing is shown in FIG. 5b for a fifteen channel system, and the conservation in bandwidth available with the present invention may be ascertained readily for comparison with the prior system of FIG. 5a. Use of arithmetic spacing will conserve overall system bandwidth, thereby allowing provision of greater power efficiency in the interrogator output coil, the responder input and output coils and the circuits of the receiver utilized to receive response signals. Furthermore, the reduction in required bandwidth allows use of less bandwidth for recovered audio signals, and therefore enables transmission of data from a response signal receiver to associated computer and register equipment over a more narrow communication channel; or alternatively, more subcarriers can be utilized in the same spectrum space, providing greater system capacity. Each additional subcarrier which one can add within an alloted spectrum space enables one to double system capacity if desired.

Radio frequency piezoelectric crystals are much smaller in size and weight than audio filters, and hence use of the invention allows a marked decrease in the size and weight of equipment required for a given system capacity. The improved responders of FIG. 2 may be assembled and tested without the crystal shunt filters shown, with the crystals being plugged in later, if desired.

An extremely important advantage of crystal filters is their high "Q" and precise resonant frequency which allows sharp and exact filtering to be attained. Crystal filters used at radio frequencies around 200 kilocycles, for example, have far higher Q's than have audio filters available for the 0.5 to 5 kc. range.

In most applications of the invention it will be desirable to use conventional double sideband modulation on the response oscillator carrier for sake of circuit simplicity, although single sideband response signals certainly may be used, perhaps with considerable advantage in cases where the attendant increase in responder circuit complexity is deemed permissible.

It will thus be seen that the objects set forth above, among those made apparent from the preceding description, are efficiently attained, and since certain changes may be made in the above constructions without departing from the scope of the invention, it is intended that all matter contained in the above description or shown in the acocmpanying drawing shall be interpreted as illustrative and not in a limiting sense.

Having described our invention, what we claim as new and desire to secure by Letters Patent is:

1. A passive responder device for use in an interrogator-responder signalling system having an interrogator unit for providing a radio frequency carrier signal and a plurality of associated radio frequency sideband signals, said responder device and said interrogator unit being capable of relative movement and said interrogator being operative to induce operating power into said responder device when said device and said unit are within a certain distance of each other, said responder device comprising in combination: a tuned circuit tuned to receive said radio frequency carrier and sideband signals to provide a first composite voltage having carrier and sideband components; radio frequency filter means connected to said tuned circuit, said filter means being tuned to eliminate at least one of said sideband components from said first composite voltage; demodulation means for demodulating said first composite voltage to provide a second composite voltage having a direct component and low frequency components derived from those of said sideband components not eliminated by said filter means; and a response oscillator operated by said second composite voltage for providing a response carrier signal which is modulated by said low frequency components.

2. Apparatus according to claim 1 in which said radio frequency filter means comprises one or more piezoelectric crystal filters.

3. Apparatus according to claim 1 in which said tuned circuit comprises a parallel LC circuit and in which said radio frequency filter means comprises one or more radio frequency piezoelectric crystals connected to said tuned circuit, each of said one or more piezoelectric crystals being series resonant at one of said sideband radio frequencies.

4. Apparatus according to claim 1 in which said radio frequency filter means comprises one or more radio frequency piezoelectric crystals connected in series with said tuned circuit, each of said one or more piezoelectric crystals being parallel resonant at one of said sideband radio frequencies.

5. Apparatus according to claim 1 for use with a single sideband interrogator transmission system wherein at least one of said radio frequency sideband signals differs in frequency from said carrier by a unique amount, in which at least one of said radio frequency filter means is tuned to a sideband frequency differing from said carrier signal by a unique amount.

6. Apparatus according to claim 1 for use with a double sideband interrogator transmission system wherein at least one radio frequency sideband signal is lower in frequency relative to said carrier frequency by the same amount that a second sideband signal exceeds said carrier frequency.

7. Apparatus according to claim 1 in which said radio frequency filter means comprises one or more piezoelectric crystal filters, in which said demodulation means comprises a diode averaging detector, and in which said response oscillator includes a semiconductor and a second tuned circuit, said response oscillator being powered solely by said second composite voltage.

8. An interrogator-responder signalling system, comprising in combination; an interrogator unit for providing an interrogator radio frequency signal including a carrier and a plurality of sidebands, each of said sidebands differing in frequency from said carrier by a different amount, said carrier being at least twice as great in amplitude as any of said sideband signals; and one or more responder devices, each of said responder devices and said interrogator unit being capable of relative movement, said interrogator being operative to induce operating voltage into any of said responder devices whenever said device and said unit are located within a certain distance from each other, each of said responder devices having a tuned circuit to receive said transmitted radio frequency carrier and sideband signals to provide a first composite voltage having carrier and certain sideband components, radio frequency filter means connected to said tuned circuit, said filter means being tuned to eliminate at least one of said sideband components from said first composite voltage, demodulation means for demodulating said first composite voltage to provide a second composite voltage having a direct component and low frequency components derived from those of said sideband components not eliminated by said filter means, and a response oscillator operated by said second composite voltage for providing a response carrier signal which is modulated by said low frequency components.

9. A system according to claim 8 wherein said plurality of sideband signals are modulated on said interrogator carrier signal as sideband signals.

10. A system according to claim 8 in which said interrogator unit includes means for generating each of said radio frequency sub-carrier signals as a separate radio frequency signal, means for generating said interrogator carrier as a separate radio frequency signal, and summing means for combining all of said separately generated radio frequency signals to provide an interrogator output signal, and an output circuit driven in accordance with said output signal.

11. Apparatus according to claim 8 in which said interrogator unit comprises means for generating a radio frequency interrogator carrier signal, means for generating a plurality of low-frequency signals, and a modulator operative to modulate said interrogator carrier signal with said plurality of low frequency signals, thereby providing said interrogator radio frequency signal.

12. Apparatus according to claim 11 in which said modulator provides double sideband modulation and in which said unit also includes a filter to remove sideband frequencies to provide a single sideband interrogator radio frequency signal.

No references cited.